United States Patent [19]

Abe et al.

[11] Patent Number: 5,218,641
[45] Date of Patent: Jun. 8, 1993

[54] WIRELESS RECEIVER

[75] Inventors: Kensaku Abe, Saitama; Nobuo Kobayashi, Tokyo, both of Japan

[73] Assignee: Sony Corporation, Tokyo, Japan

[21] Appl. No.: 739,237

[22] Filed: Aug. 1, 1991

[30] Foreign Application Priority Data

Aug. 14, 1990 [JP] Japan ................... 2-214855

[51] Int. Cl.$^5$ .......................... H04B 3/00; H04B 5/00
[52] U.S. Cl. ........................................ 381/79; 455/343
[58] Field of Search .................. 381/79, 14, 110, 77; 455/343

[56] References Cited

U.S. PATENT DOCUMENTS 4,107,613 8/1978 Queen et al. ................... 455/343
4,899,388 2/1990 Mlodzikowski et al. ........... 381/77

FOREIGN PATENT DOCUMENTS 1811455 6/1969 Fed. Rep. of Germany .

OTHER PUBLICATIONS

Patent Abstracts of Japan, unexamined applications, E section, vol. 3, No. 143, No. 27, 1979, The Patent Office Japanese Government, p. 121 E 154, Kokai-No. 54-122 013 (Matsushita Denki Sangyo).

Patent Abstracts of Japan, unexamined applications, E field, vol. 5, No. 99, Jun. 26, 1981, The Patent Office Japanese Government, p. 167 E 63, Kokai-No. 56-44 230 (Arupain).

Primary Examiner—Forester W. Isen
Attorney, Agent, or Firm—Lewis H. Eslinger; Jay H. Maioli

[57] ABSTRACT

A wireless receiver has an FM receiver for receiving an infrared radiation modulated by an audio signal. The received infrared radiation is demodulated into the audio signal, which is then supplied through a power amplifier to a loudspeaker unit or a headphone unit. The wireless receiver includes a detector for detecting whether or not the infrared radiation is received. An output signal from the detector is used to turn the power supply of the FM receiver and the power amplifier on or off. The user of the wireless receiver is not required to turn the receiver on and off manually.

2 Claims, 4 Drawing Sheets

WIRELESS RECEIVER

BACKGROUND OF THE INVENTION

1. Field of the Invention

The present invention relates to a wireless receiver for use with an electroacoustic transducer such as a loudspeaker, for example.

2. Description of the Prior Art

Some small or simple loudspeakers, called active loudspeakers, include a power amplifier powered by a battery and housed in a loudspeaker enclosure.

The circuit arrangement of one such active loudspeaker is illustrated in FIG. 1 of the accompanying drawings. The illustrated circuit components are all housed in a loudspeaker enclosure.

The loudspeaker has an input terminal 1 supplied with an audio signal SA, a power amplifier 2 for amplifying the audio signal SA, and a loudspeaker unit 3 for converting the audio signal SA into sounds. A power supply battery 5 comprises four series-connected dry cells, for example. The battery 5 is connected to a power line of the power amplifier 2 through a power switch 6.

A detector 8 is connected to the input terminal 1 for detecting whether there is an audio signal SA supplied to the input terminal 1 or not. A detected signal from the detector 8 is supplied through a driver 9 as a control signal to the power switch 6. The voltage from the battery 5 is applied as an operating voltage to the detector 8 and the driver 9 at all times.

When an audio signal SA is supplied to the input terminal 1, it is detected by the detector 8, which applies a detected signal SD to the driver 9, thereby turning on the switch 6. The voltage of the battery 5 is therefore applied through the switch 6 as an operating voltage to the power amplifier 2. Accordingly, the audio signal SA supplied to the input terminal 1 is amplified by the power amplifier 2 and supplied to the loudspeaker unit 3.

When the audio signal SA is no longer supplied to the input terminal 1, no detected signal SD is produced by the detector 8, and hence the switch 6 is turned off.

Since certain poor frequency characteristics of the loudspeaker unit 3 can be compensated for by the power amplifier 2, the loudspeaker can radiate high-quality reproduced sounds even through it is small in size.

As the power amplifier 2 is automatically energized or de-energized depending on whether there is supplied an audio signal SA or not, the user of the loudspeaker is not required to turn on and off the power switch.

The current consumed by the detector 8 and the driver 9 can be sufficiently minimized, and the power amplifier 2 is automatically turned off when the audio signal SA is no longer supplied. Consequently, any wasteful consumption of the battery 5, which would otherwise be the case if the user forgot to turn off the power switch, is avoided.

Inasmuch as the battery 5 is housed in the loudspeaker, no external power supply cable is needed. An audio signal from a headphone stereo set can easily be reproduced by the loudspeaker.

However, since an audio signal SA has to be supplied through the input terminal 1 to the power amplifier 2, a signal cable needs to be connected to the input terminal 1.

One solution is to supply an audio signal SA to the loudspeaker through wireless signal transmission.

FIGS. 2 and 3 show conventional loudspeakers with wireless signal reception capabilities.

In FIG. 2, an audio signal SA is supplied through infrared radiation. More specifically, when an audio signal transmitter (not shown) is turned on, an infrared radiation LT which is modulated by a remote control signal SC is emitted by the audio signal transmitter. The emitted infrared radiation LT is detected by a photodiode 11 and converted into a signal ST, which is then applied to a decoder 14. The decoder 14 decodes the signal ST back into the remote control signal SC, which is applied to the driver 9 to turn on the switch 6.

Therefore, the operating voltage is now applied to a signal receiver 12 and the power amplifier 2 by the battery 5.

Then, the audio signal transmitter transmits an infrared radiation LT that is modulated by an audio signal SA. The infrared radiation LT is detected by the photodiode 11 and converted into a signal ST, which is then supplied to the receiver 12. The receiver 12 converts the signal ST into the audio signal SA. The audio signal SA is then supplied through the power amplifier 2 to the loudspeaker unit 3.

The loudspeaker shown in FIG. 2 does not require either an external signal cable or an external power supply cable. The loudspeaker may be placed in any position where the user wants it to reproduce sounds, and the user can readily enjoy reproduced sounds from the loudspeaker.

In FIG. 3, when a switch 16 is depressed, a timer 17 is triggered by a signal from the switch 16, and the switch 6 remains turned on for a certain period of time by an output signal from the timer 17.

Therefore, when the switch 16 is depressed and the audio signal transmitter emits an infrared radiation LT modulated by an audio signal SA, the audio signal SA is reproduced as sounds by the loudspeaker unit 3.

The loudspeaker shown in FIG. 3 also requires no external signal cable nor no external power supply cable. The loudspeaker may be placed anywhere, and the user can readily enjoy reproduced sounds from the loudspeaker.

With the circuit arrangement shown in FIG. 2, it is necessary for the user to turn on and off the power supply of the audio signal transmitter. If the user forgets to turn on or off the audio signal transmitter, the loudspeaker will not reproduce sounds or will cause a wasteful consumption of the battery 5.

The decoder 14 needs to be energized at all times. However, it is not practical to energize the decoder 14 at all times because it consumes a large current.

The switch 16 of the loudspeaker shown in FIG. 7 needs to be manually operated by the user. Even while sounds are being reproduced by the loudspeaker, when a preset period of time elapses after the switch 16 is depressed, the switch 16 is forcibly turned off by the timer 17. Therefore, the sound reproduction may be interrupted undesirably.

OBJECTS AND SUMMARY OF THE INVENTION

It is an object of the present invention to provide a wireless receiver which will eliminate the above drawbacks of the conventional loudspeakers.

According to the present invention, a wireless receiver comprises an FM receiver for receiving an FM signal modulated by an audio signal and demodulating the received FM signal into the audio signal, a power amplifier for amplifying the audio signal from the FM receiver, an electroacoustic transducer for converting the amplified audio signal from the power amplifier into acoustic energy, a battery, a power supply line connected to the FM receiver and the power amplifier, a switching element connected in series between the battery and the power supply line, and a detector for detecting whether there is an FM signal received by the FM receiver or not, the detector comprising a narrow-band AM receiver and supplied with the voltage of the battery as an operating voltage. The detector supplies a detected output signal as a control signal to the switching element. When the FM signal is detected by the detector, the switching element is turned on by the detected output signal to apply the voltage of the battery as an operating voltage to the FM receiver and the power amplifier, and at the same time the FM signal is received and demodulated into the audio signal by the FM receiver, and the audio signal is supplied through the power amplifier to the electroacoustic transducer. When the FM signal is not detected by the detector, the switching element is tuned off by the detected output signal to stop applying the voltage of the battery to the FM receiver and the power amplifier.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

A wireless receiver according to the present invention is incorporated in a loudspeaker to which an audio signal is transmitted by infrared radiation. First, a transmitter for transmitting an audio signal by an infrared radiation LT will be described below with reference to FIGS. 6, 7A, and 7B.

Figure 6:
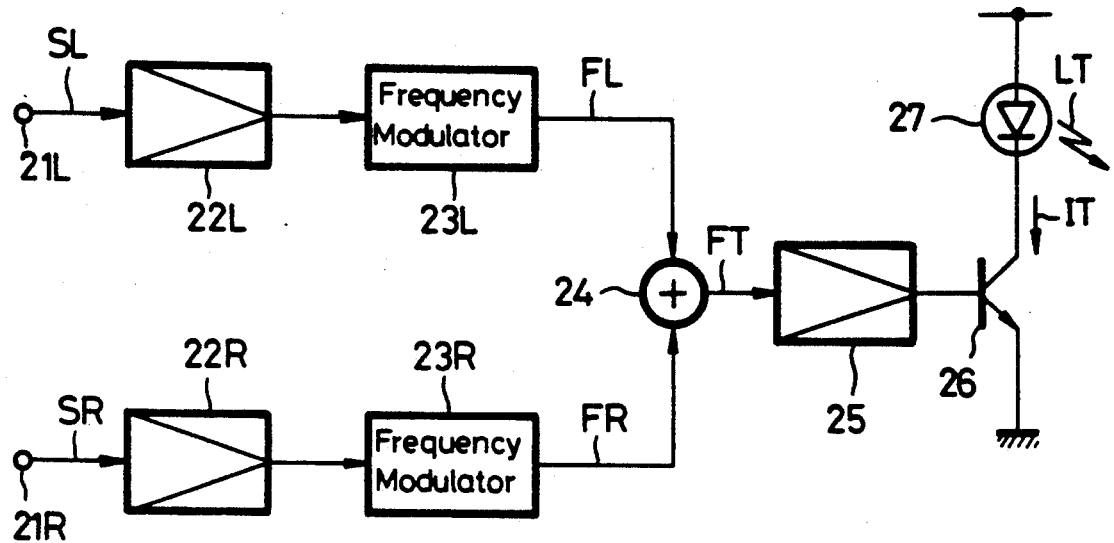
FIG. 6 is a block diagram of a signal transmitter.

In FIG. 6, stereophonic audio signals SL, SR in left and right channels are supplied from terminals 21L, 21R to respective frequency modulators 23L, 23R. The frequency modulators 23L, 23R modulate carrier signals with the audio signals SL, SR, and produce FM signals FL, FR. By way of example, the carrier frequency of the FM signal FL is 2.3 MHz, the carrier frequency of the FM signal FR is 2.8 MHz, and the maximum frequency deviation of the signals FL, FR is 150 KHz.

Figure 7A:
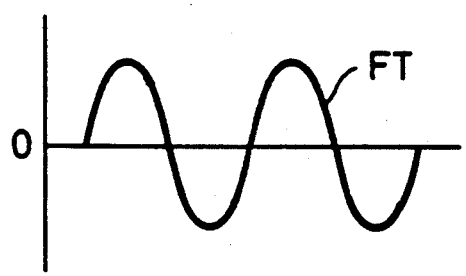
FIGS. 7A and 7B are diagrams of signal waveforms of the signal transmitter shown in FIG. 6.

The FM signals FL, FR are then supplied to an adder 24 by which they are added into a signal FT as shown in FIG. 7A. The signal FT is supplied through a drive amplifier 25 to the base of a final-stage transistor 26. The base 26 is supplied with a DC bias having a magnitude which is equal to, or slightly larger than, ½ of the peak value of the signal FT. The transistor 26 has a collector connected to an infrared LED 27.

Figure 7B:
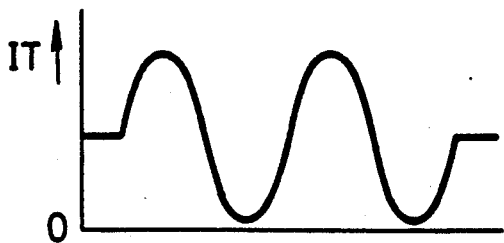

Therefore, a signal current IT as shown in FIG. 7B flows through the LTD 27. The signal current IT has a DC level corresponding to the central level (0 level) of the signal FT, and an instantaneous level that varies with the instantaneous level of the signal FT. Since the transistor 26 is DC-biased, the current IT is nil or slightly greater than nil at negative peaks of the signal FT.

The LED 27 emits an infrared radiation LT whose intensity varies with the current IT, i.e., which is modulated by the signals SL, SR.

Figure 4:
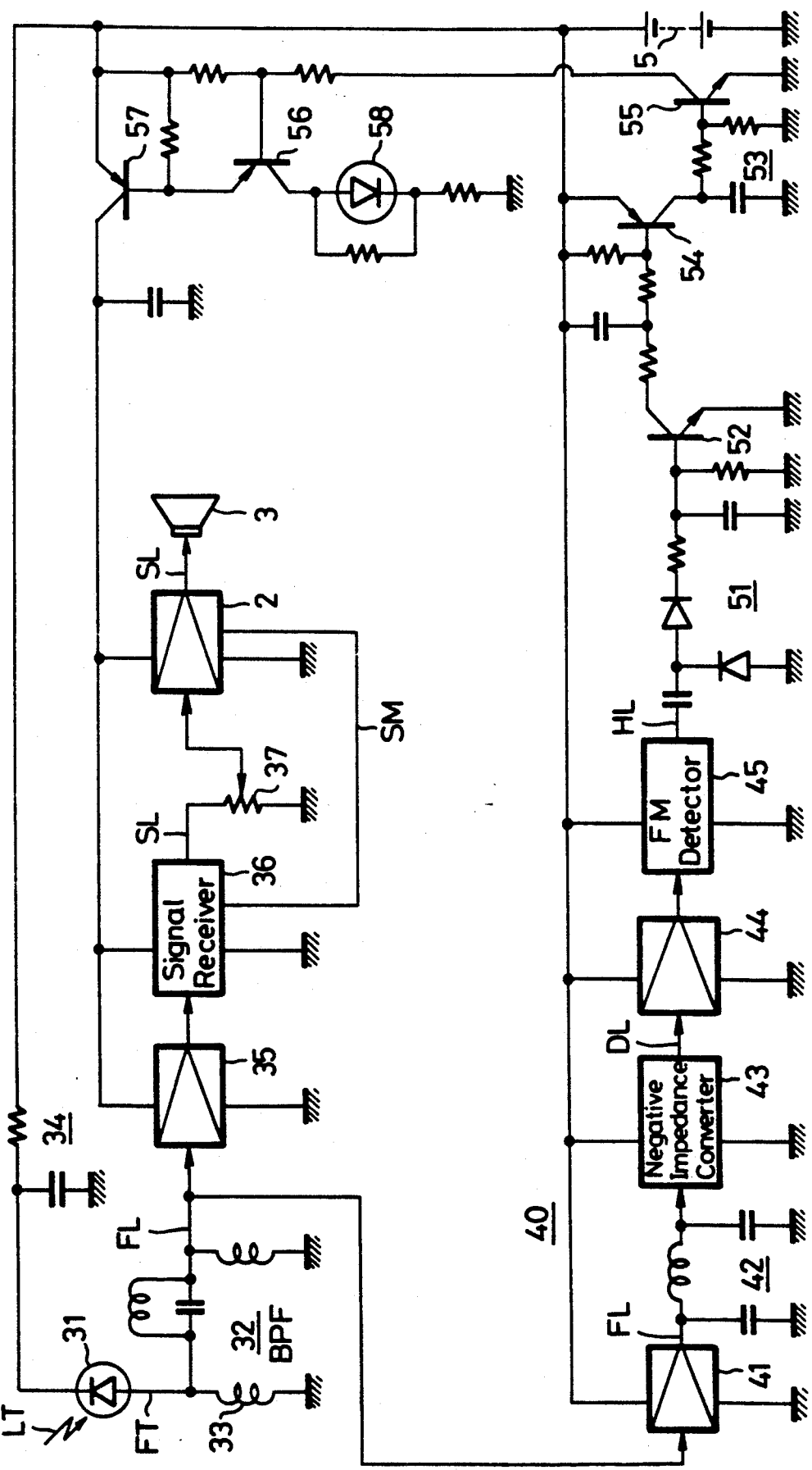
FIG. 4 is a block diagram of a wireless receiver, combined with a loudspeaker, according to the present invention.

The loudspeaker which reproduces sounds in response to the infrared radiation LT is shown in FIG. 4. FIG. 4 shows only a left-channel circuit arrangement of a stereophonic reproduction system. The circuit components shown in FIG. 4 are housed in a left-channel loudspeaker enclosure (not shown).

The loudspeaker has a photodetector 31, e.g., a photodiode, which is positioned on an outer panel of the loudspeaker enclosure, for receiving the infrared radiation LT from the signal transmitter. To the photodiode 31, there is connected in series an input coil 33 of a bandpass filter 32. The series-connected circuit of the photodiode 31 and the input coil 33 is connected to a power supply battery 5 through a decoupling circuit 34.

The bandpass filter 32 is of a Pi network and has a passband for passing the FM signal FL of the signal FT (or the FM signal FR if the loudspeaker has a right-channel circuit arrangement). The battery 5 comprises four series-connected dry cells, and produces a voltage of 6 V.

When the infrared radiation LT emitted from the signal transmitter is detected by the photodiode 31, the photodiode 31 produces a signal FT, and the filter 32 obtains an FM signal FL.

The FM signal FL is supplied through an RF amplifier 35 to an FM receiver 36. The FM receiver 36 is in the form of a general one-chip IC for receiving FM signals, and includes various circuits ranging from an RF amplifier to a frequency demodulator. Therefore, the FM receiver 36 converts the FM signal FL into an intermediate-frequency signal having a frequency of 10.7 MHz and demodulates the intermediate-frequency signal back into a left-channel audio signal SL.

The audio signal SL is then supplied through a volume-adjusting rheostat 37 and a power amplifier 2 to a loudspeaker unit 3.

The power amplifier 2 is supplied with a muting signal SM from the FM receiver 36. When no FM signal FL is supplied to the FM receiver 36, the muting signal SM is applied to the power amplifier 2 to cut off the output thereof.

The power supply for the RF amplifier 35, the FM receiver 36, and the power amplifier 2 is controlled as follows: A transistor 57, serving as a power switch, has an emitter and a collector that are connected in series between the battery 5 and a power line connected to the RF amplifier 35, the FM receiver 36, and the power amplifier 2.

The FM signal FL from the bandpass filter 32 is supplied to a detector 40 which comprises a narrow-band AM receiver. The detector 40 is supplied, at all times, with the voltage of the battery 5 as an operating voltage directly without any switch therebetween.

Figure 5A:
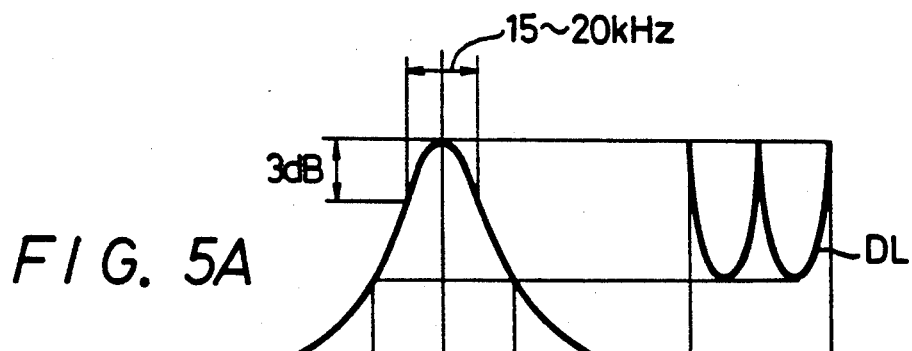
FIG. 5 is a diagram showing characteristics and signal waveforms of the wireless receiver shown in FIG. 4.
Figure 5B:
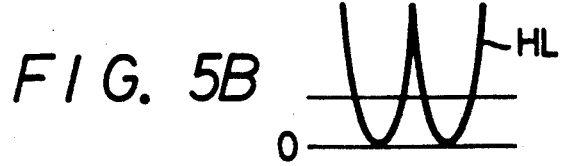

The FM signal FL from the bandpass filter 32 is supplied through an RF amplifier 41 to a Pi-network tuner 42 which is tuned to the FM signal FL. The tuner 42 is connected at its output terminal to a negative-impedance converter 43 which presents a negative input impedance. The negative input impedance of the converter 43 cancels the equivalent parallel resistance of the tuner 42. As shown in FIG. 5 at A, the tuner 42 has a bandwidth ranging from 15 to 20 kHz.

The FM signal FL supplied to the tuner 42 is subject to slope detection, and a detected signal DL is produced by the converter 43.

The signal DL is then supplied through an amplifier 44 to an AM detector 45 which extracts a second harmonic signal HL from the audio signal SL as shown in FIG. 5 at B. The signal HL is then supplied through a DC reproducer 51 to the base of a transistor 52.

Since when the photodiode 31 detects the infrared radiation LT, the signal FL is produced, the transistor 52 is turned on by the signal HL. When no infrared radiation LT is detected by the photodiode 31, no signal FL is produced. Therefore, no signal HL is produced, and the transistor 52 is turned off.

When the infrared radiation LT is detected, the transistor 52 is turned on. Therefore, a transistor 54 is also turned on, and so is a transistor 55. When the transistor 55 is turned on, a transistor 56 is also turned on, and so is the transistor 57.

Therefore, the voltage of the battery 5 is applied through the transistor 57 to the RF amplifier 35, the FM receiver 36, and the power amplifier 2. Stated otherwise, the power supply for these circuit components is turned on. Accordingly, as described above, the RF amplifier 35 produces the FM signal FL, and the FM receiver 36 produces the audio signal SL, which is applied through the power amplifier 2 to the loudspeaker unit 3. At this time, an LED 58 connected to the transistor 56 is energized to indicate that the power supply is turned on.

When the signal transmitter stops emitting the infrared radiation LT, the infrared radiation LT is no longer detected by the photodiode 31. Therefore, the transistor 52 is turned off, and so are the transistors 54, 55. With the transistor 55 turned off, the transistor 56 is turned off, and so is the transistor 57.

As a consequence, the voltage of the battery 5 is no longer supplied to the RF amplifier 35, the FM receiver 36, and the power amplifier 2, i.e., the power supply for these circuit components is turned off.

Even when the transistor 52 is turned off, the transistor 55 remains energized for about 1 minute, for example, because of a time-constant circuit 53. After elapse of 1 minute, the transistor 55 is turned off. Even when the infrared radiation LT transmitted toward the photodiode 31 is interrupted by an obstacle, such as a human being moving across between the transmitter and the receiver, the power supply is not immediately turned off. In the event of an interruption of the infrared radiation LT, the FM signal FL is not supplied to the FM receiver 36, and hence the FM receiver 36 produces limiter noise. Since, at this time, the power amplifier 2 is muted, or its output is cut off, by the muting signal SM, the limiter noise is not produced as sounds by the loudspeaker unit 3.

The right-channel loudspeaker (not shown) is of the same arrangement as described above and operates in the same manner as described above.

With the arrangement of the present invention, the loudspeaker does not require any external signal cable or any external power supply cable, but is still able to radiate reproduced sounds. Particularly, whether the infrared radiation LT modulated by the audio signal SL is emitted or not is detected by the detector 40, and the energization and de-energization of the transistor 57 as the power switch is controlled by the output signal from the detector 40. Therefore, even when sounds are to be reproduced from the loudspeaker unit 3, the user is not required to operate any power supply switch. In addition, when sound reproduction is stopped, the power supply is automatically turned off.

The loudspeaker is free of a failure of the loudspeaker unit 3 to reproduce sounds or a wasteful consumption of the battery 5, which would otherwise result from an inadvertence on the part of the user.

The detector 40 needs to be energized at all times. However, inasmuch as the detector 40 is in the form of an AM receiver, its current consumption can sufficiently be reduced, e.g., to 400 mA. Thus, any current consumption while the loudspeaker is in a standby mode does not pose serious problems, and the loudspeaker is sufficiently practical.

The detector 40 serves as a load on the filter 32. However, if the input impedance of the amplifier 41 is increased, the detector 40 does not affect the filter 32 and the amplifier 35.

Extraneous light applied to the photodiode 31 may be a source of noise. However, the loudspeaker is not susceptible to such extraneous light because the audio signals SL, SR are converted into the FM signals FL, FR and the infrared radiation LT is modulated by the FM signals FL, FR. Furthermore, selection by the FM receiver 36 of the FM signals FL, FR makes the loudspeaker more resistant to noise.

Since slope detection is carried out by the detector 40, the negative-impedance converter 43 is connected to the tuner 42 to reduce its bandwidth. This arrangement also increases the Q of the tuner 42, thereby increasing the detection sensitivity of the detector 40.

The circuit components shown in FIG. 4 may be housed in a headphone, and a headphone unit may be used instead of the loudspeaker unit 3.

Rather than the infrared radiation LT, the signal FT or an FM signal converted in frequency from the signal FT may be transmitted from the transmitter to the wireless receiver.

Figure 1:
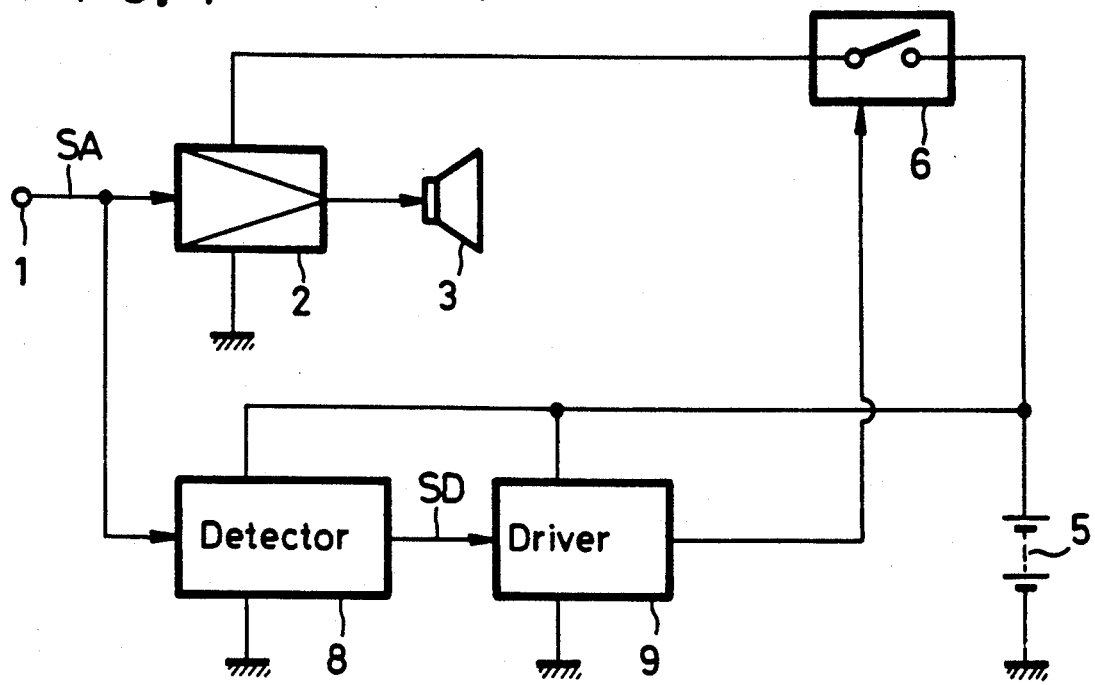
FIGS. 1 through 3 are block diagrams of conventional loudspeakers.
Figure 2:
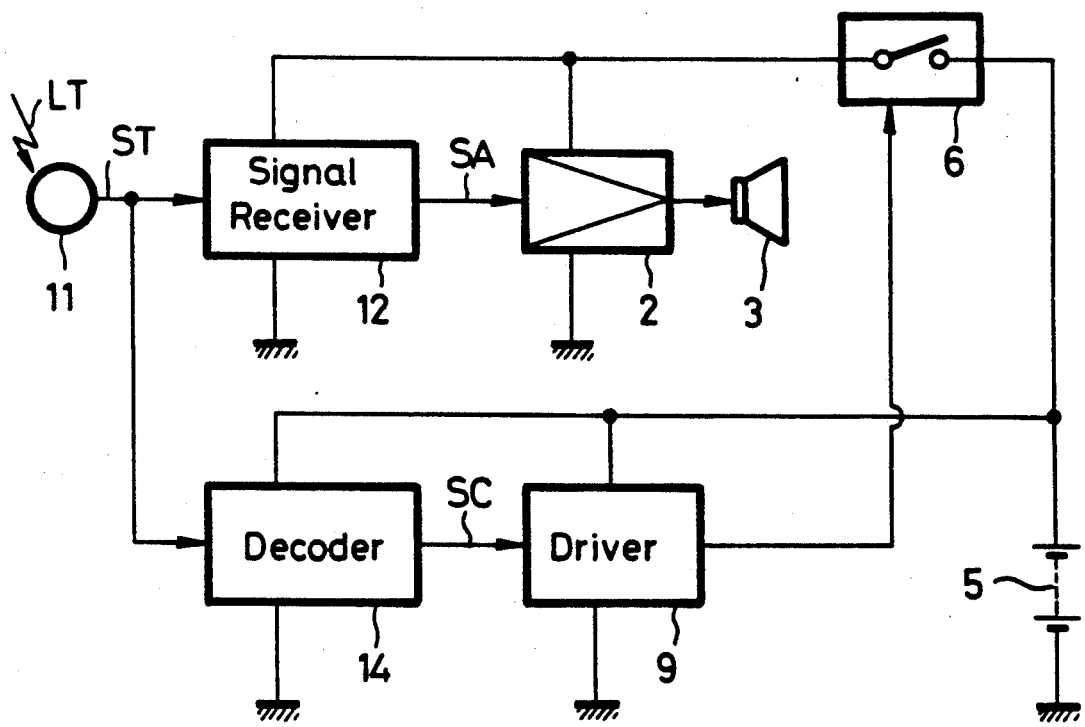
Figure 3:
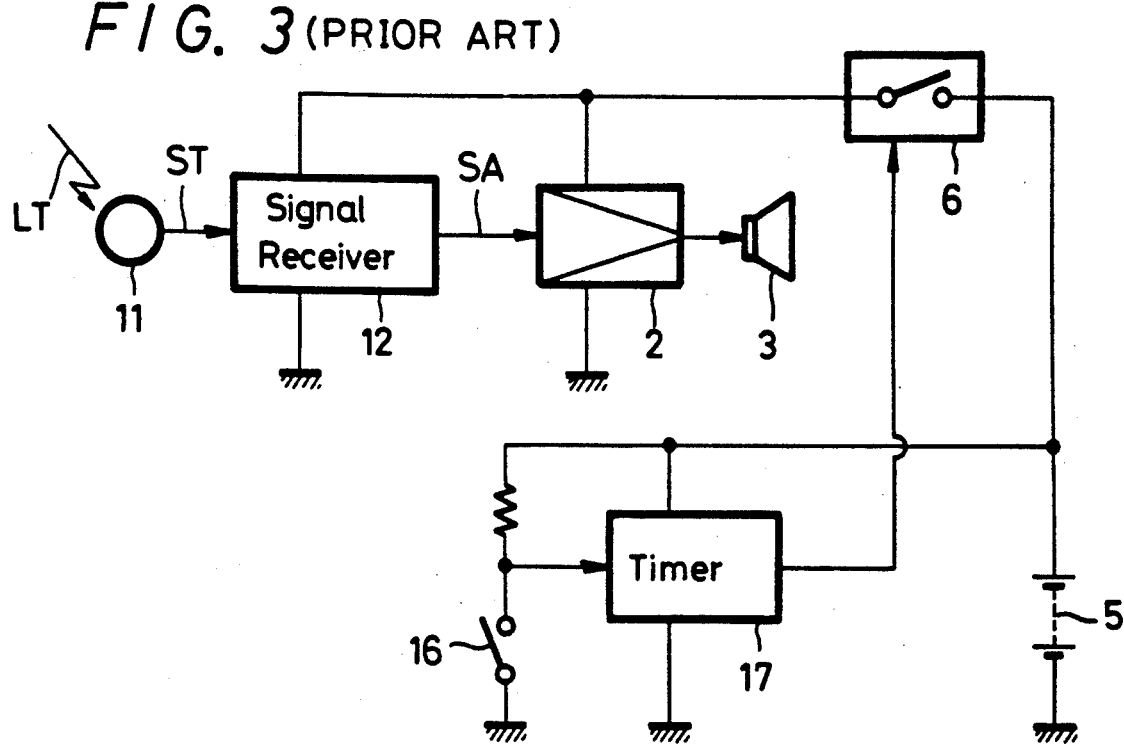

In the case where the transmitter shown in FIG. 6 employs a battery as its power supply, the power supply thereof may be automatically turned on and off by the arrangement shown in FIG. 1.

Having described a preferred embodiment of the invention with reference to the accompanying drawings, it is to be understood that the invention is not limited to that precise embodiment and that various changes and modifications could b effected by one skilled in the art without departing from the spirit or scope of the invention as defined in the appended claims.

We claim as our invention:

1. A wireless receiver comprising:
    an FM receiver including a bandpass filter for receiving and passing an FM signal modulated by an audio signal and demodulating the signal passed by said bandpass filter into the audio signal;
    a power amplifier for amplifying the audio signal from said FM receiver;
    an electroacoustic transducer for converting the amplified audio signal from said power amplifier into acoustic energy;

a battery;

a power supply line connecting said battery to said FM receiver and said power amplifier;

a switching element connected in said power supply line in series between said battery and said FM receiver and said power amplifier;

a detector having an input connected to the signal passed by said bandpass filter for detecting whether or not there is an FM signal received by said FM receiver;

said detector comprising a narrow-band AM receiver supplied by a direct connection with the voltage of said battery as an operating voltage and including a turner tuned to the frequency of the FM signal, a negative impedance converter, and an AM detector;

the arrangement being such that said detector supplies a detected output signal as a control signal to said switching element, and when said FM signal is detected by said detector, said switching element is turned on by said detected output signal to apply the voltage of said battery as an operating voltage to said FM receiver and said power amplifier, and at the same time said FM signal is received and demodulated into said audio signal by said FM receiver, and the audio signal is supplied through said power amplifier to said electroacoustic transducer, and when said FM signal is not detected by said detector, said switching element is turned off by said detected output signal to stop applying the voltage of said battery to said FM receiver and said power amplifier.

2. A wireless receiver according to claim 1 wherein said FM receiver comprises means for supplying a muting signal to said power amplifier to mute the power amplifier when the FM signal is not received by said FM receiver.

* * * * *

UNITED STATES PATENT AND TRADEMARK OFFICE
CERTIFICATE OF CORRECTION

PATENT NO. : 5,218,641
DATED : June 8, 1993
INVENTOR(S) : Kensaku Abe and Nobuo Kobayashi It is certified that error appears in the above-indentified patent and that said Letters Patent is hereby corrected as shown below:

On the Title Page, Item [57], line 1, delete "an" second occurrence.

Column 2, line 41, delete "no".

Column 5, line 68, change "or" to --nor--.

Column 6, line 54, change "b" to --be--.

Column 7, line 14, change "turner" to --tuner--.

Signed and Sealed this

Twelfth Day of July, 1994

Attest:

BRUCE LEHMAN

*Attesting Officer*   *Commissioner of Patents and Trademarks*